Figure 1:
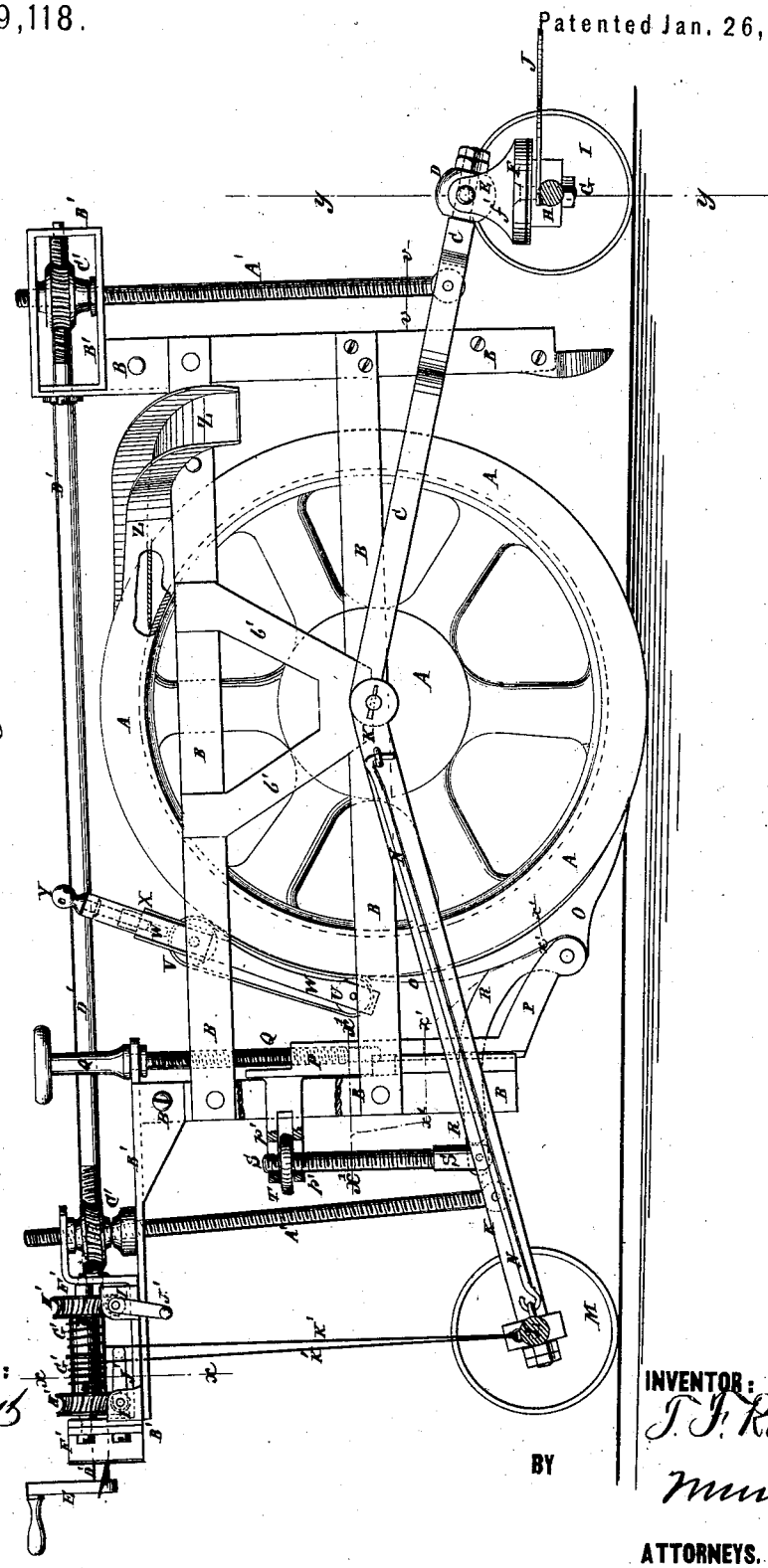

T. F. RANDOLPH.
Ditching-Machine.

No. 159,118.

2 Sheets--Sheet 1.

Patented Jan. 26, 1875.

WITNESSES:
A. W. Almqvist
A. F. Terry

INVENTOR:
T. F. Randolph
BY
Munn & Co
ATTORNEYS.

2 Sheets--Sheet 2.
T. F. RANDOLPH.
Ditching-Machine.
No. 159,118. Patented Jan. 26, 1875.
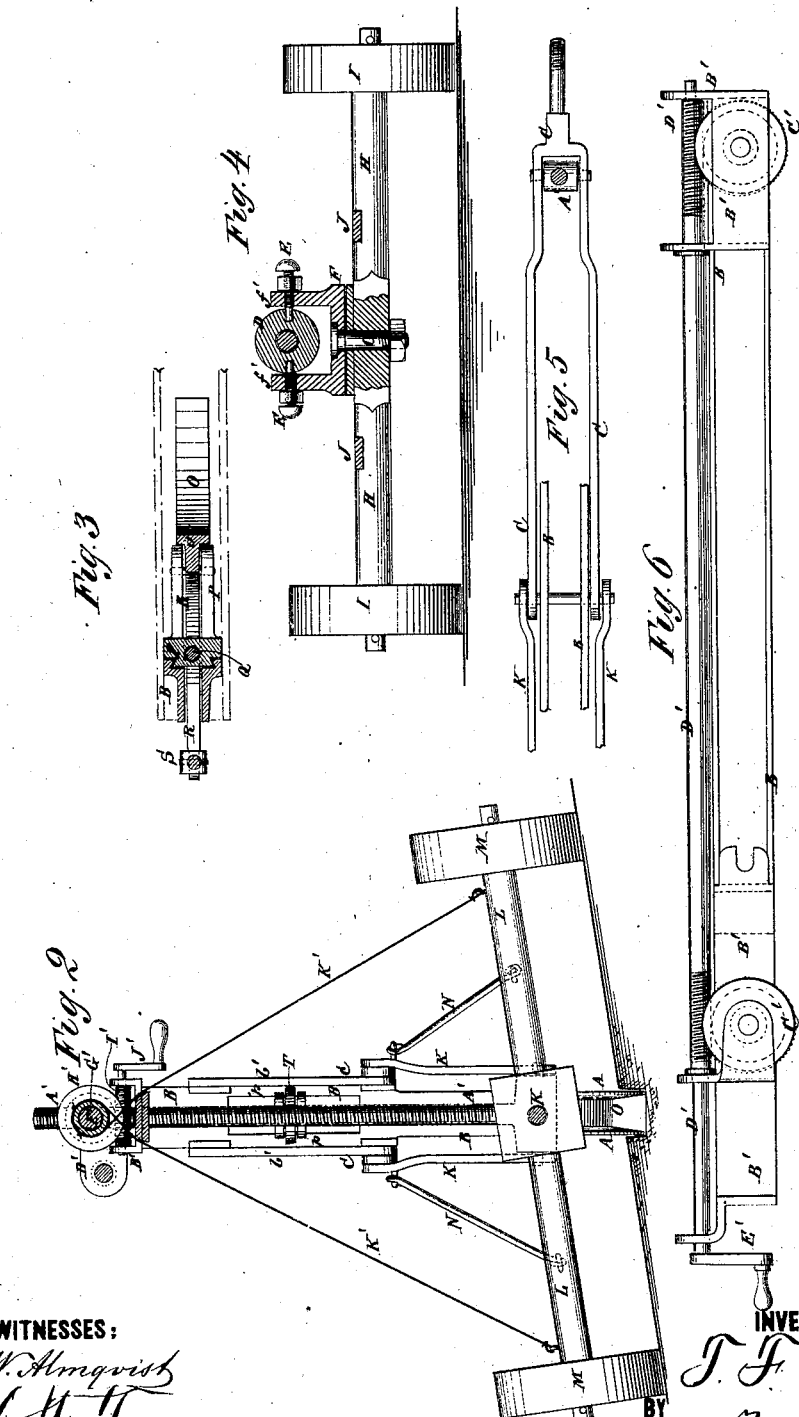
WITNESSES:
A. W. Almqvist
H. T. Terry
INVENTOR:
T. F. Randolph
BY
ATTORNEYS.

UNITED STATES PATENT OFFICE.

THEODORE F. RANDOLPH, OF MORRISTOWN, NEW JERSEY.

IMPROVEMENT IN DITCHING-MACHINES.

Specification forming part of Letters Patent No. 159,118, dated January 26, 1875; application filed December 12, 1874.

*To all whom it may concern:*

Be it known that I, THEODORE F. RANDOLPH, of Morristown, in the county of Morris and State of New Jersey, have invented a new and useful Improvement in Ditching-Machine, of which the following is a specification:

Figure 1, Sheet 1, is a side view of my improved machine. Fig. 2, Sheet 2, is a rear view of the same, partly in section, through the line $x\ x$, Fig. 1. Fig. 3, Sheet 2, is a detail section taken through the line $x'\ x'$, Fig. 1. Fig. 4, Sheet 2, is a detail view of the forward wheels, axle, and swivel, partly in section, through the line $y\ y$, Fig. 1. Fig. 5, Sheet 2, is a detail top view of the forward draft-bar, partly in section, through the line $v\ v$, Fig. 1. Fig. 6 is a detail top view of the feed-device.

Similar letters of reference indicate corresponding parts.

My invention has for its object to furnish an improved ditching-machine, which shall be so constructed as to work equally well in clayey or sticky soils, and in sandy or loose soils, which may be readily adjusted and controlled, so as to sink a vertical ditch upon inclined or uneven ground, and which will enable the ditching-wheel to be readily fed down as the ditch increases in depth. The invention consists in a novel combination of parts for adjusting the angle and height of the shoe with relation to the ditching-wheel, in the ball-bearing, the pivots, and the lugged plate, in combination with the king-bolt, the forward axle, and the forward draft-bar of the ditcher; in the combination of the two drums, the two screw-wheels, the two swiveled screws, and the two cords or chains with the frame-work of the ditcher, and with the axle swiveled to the rear end of the rear draft-bar of the ditcher; in the combination of the swiveled screw-rod, the two swiveled screw-wheel nuts, and the two screws with the front and rear draft-bars, and with the frame-work and the ditching-wheel of the ditcher, as hereinafter fully described.

A is the ditching-wheel, which is made large and narrow, and with a flanged or channeled rim to take up the soil from the bottom of the ditch and discharge it upon the ground at the side of the said ditch. The wheel A is placed between the side bars of the upright frame B, and its journals work in bearings in the middle parts of the lower side bars, which are strengthened by the inclined or V bars $b'$. The frame B thus rides upon the journals of the ditching-wheel A. C is the forward draft-bar, which is slotted from its rear end to receive the forward parts of the frame B, and wheel A, and the rear ends of its arms or branches are pivoted to the opposite journals of the said wheel A. D is a ball, which is placed upon the rounded forward end of the bar C, where it is secured in place by a nut or nuts screwed upon the end of the said bar C. In the opposite sides of the ball D are formed holes to receive the forward ends of two screw-pins, E, which pass in through screw-holes in the lugs or studs $f'$, formed upon or attached to the plate F. The plate F is pivoted by a king-bolt, G, to the middle part of the forward axle, H, upon the journals of which are placed small wide-rimmed wheels I. By this construction the wheel B and frame B can be raised and lowered without affecting the axle H, and the axle H can take any inclination the surface of the ground may require without affecting the wheel A and frame A. To the axle H is attached the tongue J, to which the draft is applied, and by which the machine is guided. K is the rear draft-bar, the forward part of which is slotted to receive the rear part of the wheel A and the frame B, and the forward ends of its arms or branches are pivoted to the opposite journals of the said wheel A. The rear end of the draft-bar K is made round, is passed through a hole in the middle part of the rear axle, L, and is secured in place by one or more nuts. This allows the rear axle to be inclined in either direction to accommodate it to the surface of the ground. Upon the journals of the axle L are placed small wide-rimmed wheels M, and the said axle is held at right angles with the bar K by rods N, the rear ends of which are pivoted to the axle L. The forward ends of the rods N have hooks formed upon them, which hook into eyes attached to the forward part of the arms of the rear draft-bar K. The edges of the flanges of the ditching-wheel A are made sharp, so that they may be sunk into the soil at the bottom of the ditch by the weight of the wheel A and frame B, so as to separate the sides of the slice of soil to be raised from the sides of the ditch. The bottom of the slice thus separated and packed into the channel of the wheel A is separated from the soil at the bottom of the ditch by the shoe O, which is made of such a size as to fit into the channel of the wheel A. The shoe O is pivoted at the middle part of its rear side to a block, P, that slides up and down upon a way formed to receive it upon the forward side of the rear post of the frame B. Q is a hand-screw, which is swiveled to the upper part of the frame B, passes down along the forward side of the rear post of said frame B, and enters a screw-hole in the upper end of the sliding block P, so that the said block P, and with it the shoe O, can be raised and lowered as desired by turning the hand-screw Q.

To the rear side of the shoe O, at or near its pivoting-point, is rigidly attached, or upon it is formed, an arm, R, that passes back through a slot in the lower end of the rear post of the frame B, and to its rear end, upon the rear side of said post, is hinged the lower end of a screw, S. The screw S passes up along the rear side of the said rear post of the frame B, and passes through a lug, $p'$, formed upon the rear side of the upper end of the sliding block P, and which projects through a longitudinal slot in the said rear post, so that the arm R and screw S may move up and down with the sliding block P and shoe O. The lug $p'$ is slotted horizontally from its rear end, to receive the hand-nut T, through which the screw S passes.

By this arrangement, by turning the nut T the screw S may be moved up and down to work the shoe O upon its pivot.

When the ditcher is to be used in some soil the nut T is turned to force the screw S downward. This movement forces the lower end of the shoe O into the channel of the wheel A, and the upper end of said shoe O outward. By this adjustment the space between the shoe O and wheel A will be smallest at the lower end of said shoe, and will gradually increase in size, so that only a thin slice of soil can be taken up, which slice will pass through a space gradually increasing in size, so that it will not be liable to pack and clog the machine.

When the ditcher is to be used in other soils, the nut T is turned to draw the screw S upward, which throws the lower end of the shoe O outward, and its upper end inward. This adjustment makes the space between the shoe O and wheel A largest at the lower end of the shoe O, so that a thicker slice may be taken up, and may be packed more and more closely as it passes up.

As the soil passing up leaves the upper end of the shoe, it is kept in place by an endless belt that passes around two rollers, U V. The lower roller, U, is pivoted to a frame, W, which is secured in an inclined position to the side bars of the frame B. The upper roller, V, is pivoted to a frame, X, which is slid up and down within the frame W to tighten and slacken the endless belt. The inner frame, X, is adjusted by means of a screw, Y, swiveled to the top bar of the frame W, and which screws into a nut attached to the top bar of the frame X.

As the soil passes over the top of the wheel A it is delivered into a chute, Z, by which it is discharged upon the side of the ditch, and which is provided with a tongue, which enters the channel of the wheel A, and serves as a scraper to disengage the soil from said channel.

A' are two screws, placed the one in front and the other in the rear of the frame B, and in the same vertical plane with said frame. Upon the lower ends of the screws A' are formed cross-heads, of such a length as to fit into the outer parts of the slots in the draft-bars C K, and the ends of which are pivoted to the arms of said draft-bars. The screws A' pass up through guide-holes in the frames B', attached to the upper ends of the posts of the frame B, and through nuts C, swiveled to said frames B'. Upon the rims of the nuts C' are formed half screw-threads, which fit into threads formed upon the rod D', which works in bearings in the frames B', so that, by turning the screw-rod D' in one or the other direction, the nuts C' will be turned to lower or raise the screws A', and with them the frame B and ditching-wheel A. The screw-rod D' is operated by a crank, E', attached to its rear end. To the rear part of the rear frame, B', is attached a short horizontal shaft, F', upon which are placed two drums, G', to the outer ends of which are attached two screw-wheels, H', the threads of which fit into the threads of two transverse screws, I', swiveled to the said frame B', and operated by cranks J', attached to their ends. To the two drums, G', are attached the ends of two cords or chains, K', the other ends of which are attached to the rear axle, L, near its ends.

By this construction, by turning the two drums, G', in opposite directions by means of the swiveled crank-screws J' I', one of the cords or chains K' will be wound upon one of the said drums G', and the other cord or chain, K', will be unwound from the other drum, G', which enables the frame B and wheel A to be held in a vertical position, while the axle L is inclined in either direction by its wheels in passing over uneven or inclined ground.

By this construction all the necessary adjustments can be made without stopping the machine.

To the opposite sides of the lower end of the front post of the frame B are attached two knives or cutters, L, to cut or shave off the sides of the last previous cut to widen the ditch, and enable the ditching-wheel A to work freely and without binding.

Having thus described my invention, I claim as new and desire to secure by Letters Patent—

1. The combination of the sliding block P, screws Q S, arm R, and shoe O, the latter being pivoted between its extremities, and near the middle thereof, to the sliding block, and rigidly secured to or formed in one piece with the arm R, substantially as and for the purpose specified.

2. The ball-bearing D, pivots E, and lugged plate F, in combination with the king-bolt G, the forward axle, H, and the forward draft-bar C of the ditcher, substantially as herein shown and described.

3. The combination of the two drums, G', the two screw-wheels, H', the two swiveled screws, I' J', and the two cords or chains, K', with the frame-work B' B of the ditcher, and with the axle L, swiveled to the rear end of the rear draft-bar, K, of the ditcher, substantially as herein shown and described.

4. The combination of the swiveled screw-rod D', the two swiveled screw-wheel nuts, C', and the two screws, A', with the front and rear draft-bars, C K, and with the frame-work B' B, and ditching-wheel A, substantially as herein shown and described.

THEO. F. RANDOLPH.

Witnesses:
 JAMES T. GRAHAM,
 T. B. MOSHER.